United States Patent

Kunze et al.

[11] Patent Number: 5,901,915
[45] Date of Patent: May 11, 1999

[54] MAGNETIC-TAPE-CASSETTE APPARATUS

[75] Inventors: Norbert Kunze, Diez; Stefan Koch, Bad Endbach; Horst Rumpf, Herborn, all of Germany

[73] Assignee: U.S. Philips Corporation, New York, N.Y.

[21] Appl. No.: 09/065,793

[22] Filed: Apr. 23, 1998

[30] Foreign Application Priority Data

Apr. 26, 1997 [DE] Germany .......................... 197 17 777

[51] Int. Cl.⁶ ............................................... G11B 15/32
[52] U.S. Cl. ......................... 242/338; 242/340; 242/342; 242/343
[58] Field of Search ............................... 242/338, 338.4, 242/340, 342, 358.1; 360/96.3, 96.4, 132, 134

[56] References Cited

U.S. PATENT DOCUMENTS

| | | | |
|---|---|---|---|
| 3,934,839 | 1/1976 | Serizawa | 242/342 |
| 4,413,919 | 11/1983 | Applegate et al. | 242/343 |
| 4,492,998 | 1/1985 | Kamimura et al. | 242/342 |
| 4,609,164 | 9/1986 | Komatsubara et al. | 242/340 |
| 4,648,000 | 3/1987 | Shibaike et al. | 242/342 |
| 4,695,011 | 9/1987 | Komatsubara et al. | 242/340 |
| 4,887,775 | 12/1989 | Kanaguchi et al. | 242/342 |
| 5,183,219 | 2/1993 | Abeille et al. | 242/340 |

FOREIGN PATENT DOCUMENTS

4405153C2  8/1995  Germany .

Primary Examiner—John P. Darling
Attorney, Agent, or Firm—Edward W. Goodman

[57] ABSTRACT

A magnetic-tape-cassette apparatus includes a tape deck having winding mandrels (5) which are rotatably supported on bearing spindles (3), these winding mandrels being adapted to engage winding-mandrel holes in the magnetic-tape cassette (11), and each have at least one coupling fin (10a, 10b, 10c) arranged on its circumference. To facilitate lowering of the cassette (11) onto the winding mandrels (5) and to preclude any problems which could then arise, the winding mandrels (5) are mounted on the bearing spindles (3) so as to be axially movable in a range of axial movement and are each pre-loaded towards a preferred axial position by at least one spring (9).

3 Claims, 2 Drawing Sheets

MAGNETIC-TAPE-CASSETTE APPARATUS

BACKGROUND OF THE INVENTION

1. Field of the Invention

The invention relates to a magnetic-tape-cassette apparatus having a tape deck comprising winding mandrels which are rotatably supported on bearing spindles, the winding mandrels being adapted to engage winding-mandrel holes in the magnetic-tape cassette, and each comprising at least one coupling fin arranged on its circumference.

2. Description of the Related Art

Such a magnetic-tape-cassette apparatus is known from German Patentschrift 44 05 153 A1. This known magnetic-tape-cassette apparatus comprises winding mandrels which are mounted on bearing spindles so as to be rotatable. The winding mandrels engage radial grooves of the bearing spindles with spring noses, so that the axial positions of the winding mandrels are accurately defined. The winding mandrels have coupling fins which cooperate with the coupling noses provided on the reel bodies of the magnetic-tape-cassette apparatus, in such a manner that the reel bodies of the cassette are rotated when the winding mandrels are rotated.

When a magnetic-tape cassette is lowered onto such winding mandrels, problems may arise as a result of canting or jamming of the reel bodies of the magnetic-tape cassette on the winding mandrels.

SUMMARY OF THE INVENTION

It is an object of the invention to provide a magnetic-tape-cassette apparatus of the type defined in the opening paragraph, which facilitates lowering of a cassette onto the winding mandrels, and which precludes problems during lowering of the cassette onto the winding mandrels.

According to the invention, this object is achieved in that the winding mandrels are mounted on the bearing spindles so as to be axially movable in a range of axial movement and are each pre-loaded towards a preferred axial position by means of at least one spring.

In such a magnetic-tape-cassette apparatus in accordance with the invention, the winding mandrels can move away axially in the lowering direction of the magnetic-tape cassette at the onset of canting or jamming between the reel bodies of the cassette and winding mandrels. This guarantees a reliable lowering of the cassette onto the winding mandrels.

By means of the spring, the winding mandrels are urged into the preferred axial position. This preferred axial position is the axial position of the winding mandrels which is intended for playing the cassette and which, in particular, is dictated by the axial height of the magnetic head.

An advantageous embodiment of the invention is characterized in that the springs are each arranged between the bearing spindles and the winding mandrel, and the springs urge axially against the winding mandrels while acting on the bearing spindles and/or on bearing elements of a chassis plate.

The spring is constructed in such a manner that it acts upon the winding mandrels in an axial direction and is radially guided on the bearing spindle. To apply the axial force, the spring acts upon abutments which extend in radial directions. The axial force serves both to provide the axial pre-load of the winding mandrels towards the preferred axial position, and to generate a friction torque on the winding mandrel, as a result of which, a pull-back torque is produced.

This pull-back torque keeps the magnetic tape of the magnetic-tape cassette taut in the play mode.

By means of a single spring and a single integrally formed winding mandrel, it is thus possible to obtain both a pull-back torque for the winding mandrel and an axial deflection possibility for the winding mandrel, thereby guaranteeing, in a simple way, that the magnetic-tape cassette is reliably lowered onto the winding mandrel.

In a further advantageous embodiment of the invention the winding mandrels are drivable by a drive wheel over the entire range of axial movement.

If jamming occurs when the magnetic-tape cassette is lowered and the winding mandrel is urged into a lowered position by the cassette, the coupling noses of the reel bodies of the cassette lie on the coupling fins of the winding mandrels. As a result of this, the reel bodies of the cassette do not rotate when the winding mandrel is driven in the lowered position of the cassette, whereas the winding mandrel is driven by the drive wheel and can thus rotate freely. This guarantees that the winding mandrel can spring back from the lowered position into the preferred axial position.

In a further advantageous embodiment, the springs are of an integral construction.

This is very favorable for reasons of production engineering.

In a further advantageous embodiment of the invention, the integral springs comprise at least three spring arms.

This results in a very uniform distribution of the spring force.

BRIEF DESCRIPTION OF THE DRAWINGS

An embodiment of the invention will be described in more detail, by way of example, with reference to the FIGS. 1 and 2 of the diagrammatic drawings. In the drawings.

DESCRIPTION OF THE PREFERRED EMBODIMENTS

Figure 1:
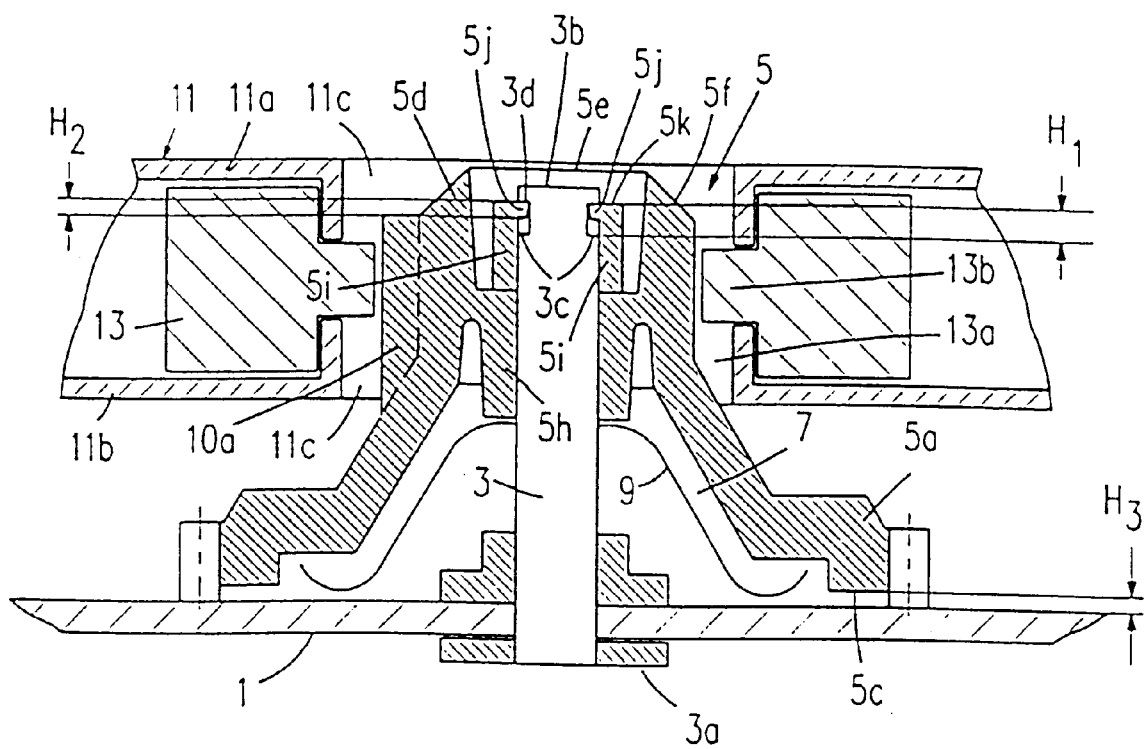
FIG. 1 is a sectional view of a winding mandrel arranged on a chassis plate of magnetic-tape-cassette apparatus so as to be axially movable on a bearing spindle.

FIG. 1 shows a chassis plate 1 of a tape deck of a magnetic-tape-cassette apparatus. In the chassis plate 1, a bearing spindle 3 is secured with the aid of plastic fixing means 3a using an outsert-molding technique. Near its upper end 3b, the bearing spindle 3 has a radial groove 3c with an axial height H1. The bearing spindle 3 carries a winding mandrel 5. The winding mandrel 5 has a pedestal 5a of conical shape having a base surface 5c. A cylindrical basic member 5d, situated above the pedestal 5a, has a conical surface 5f at its upper end 5e. The winding mandrel 5 comprises three circumferentially spaced coupling fins 10a, 10b and 10c, of which a first coupling fin 10a is shown in FIG. 1.

Inside the basic member 5d, the bearing spindle 3 is guided in a guide sleeve 5h of the winding mandrel 5. The winding mandrel 5 has spring noses 5i having projections 5j which engage the radial groove 3c of the bearing spindle 3. The projections 5j have an axial height H2. The axial height H2 of the projections 5j is smaller than the axial height H1 of the radial groove 3c of the bearing spindle 3. Thus, the winding mandrel 5 is supported on the bearing spindle 3 so as to be axially movable.

The pedestal 5a of the winding mandrel 5 has a cavity 7 in which a diagrammatically-shown spring 9 is accommodated. This diagrammatically-shown spring 9 acts upon the chassis plate 1, on the winding mandrel 5 and on the bearing spindle 3. The spring 9 exerts an axial force on the winding mandrel 5 and urges the the winding mandrel 5 upward inside the radial groove 3c, as a result of which, the upper edge 5k of the projections 5j of the spring noses 5i act upon the upper edge 3d of the radial groove 3c. A clearance of a height H3 exists between the base surface 5c of the winding mandrel 5 and the chassis plate 1. The height H3 is greater than or equal to the difference between the heights H1 and H2.

The winding mandrel 5 is axially movable in a downward direction towards the chassis plate 1 against this spring force of the spring 9.

A magnetic-tape cassette 11 is placed on the winding mandrel 5. The magnetic-tape cassette 11 has an upper bounding wall 11a and a lower bounding wall 11b. In the areas for the passage of winding mandrels, of which only one mandrel is shown, openings 11c have been provided through which the winding mandrel 5 extends. Inside the magnetic-tape cassette 11, two reel bodies 13 are juxtaposed whose center holes 13a are engageable by the winding mandrels 5. The center holes 13a of the reel bodies 13 have coupling noses 13b which project radially into the holes 13a.

The winding mandrel 5 can deflect axially in the case that the reel body of the magnetic-tape cassette is canted relative to or jams on the winding mandrel 5 when a magnetic-tape cassette, which is not shown, is placed onto the winding mandrel 5. This guarantees a reliable and trouble-free lowering of the magnetic-tape cassette onto the winding mandrel 5.

As the cassette is lowered, the coupling noses 13b of the cassette slide down along the conical surface 5f of the winding mandrel 5 and thus precludes canting or jamming in the area of the conical surface 5f of the winding mandrel 5. Canting or jamming occurs only when the coupling noses 13b of the reel bodies are applied to the coupling fins 10a, 10b and 10c. The winding mandrel 5 is then urged downward from the preferred axial position into a lowered position. The coupling noses of the reel body 13 of the cassette 11 are then no longer in engagement with the coupling fins 10a, 10b and 10c and are, therefore, not rotated when the winding mandrel 5 is driven in its lowered position. The winding mandrel 5 is rotated further by a drive wheel, which is not shown, so that the coupling fins 10a, 10b and 10c get between the coupling noses 13b of the reel body 13, and the winding mandrel 5 can spring back from the lowered position into the preferred axial position under the influence of the force of the spring 9.

In addition to the axial pre-load of the winding mandrel 5, the spring 9 also produces a pull-back torque which keeps the magnetic tape of the magnetic-tape cassette taut in the play mode. This pull-back torque is produced during rotation of the winding mandrel 5 both as a result of friction between the spring 9 and the winding mandrel 5 and as a result of friction between the radial groove 3c and the projections 5j of the spring noses 5i.

Figure 2:
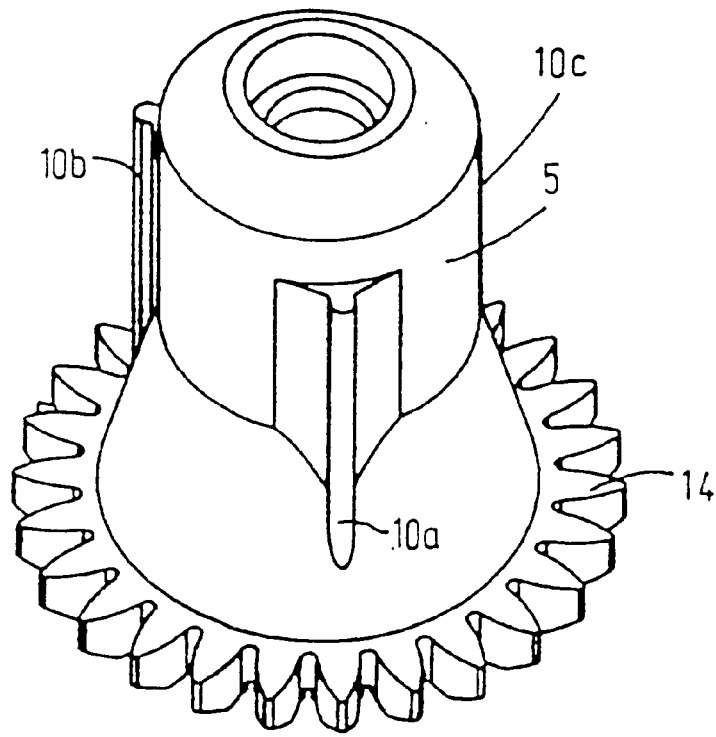
FIG. 2 is a perspective exploded view of the winding mandrel.
Figure 2:
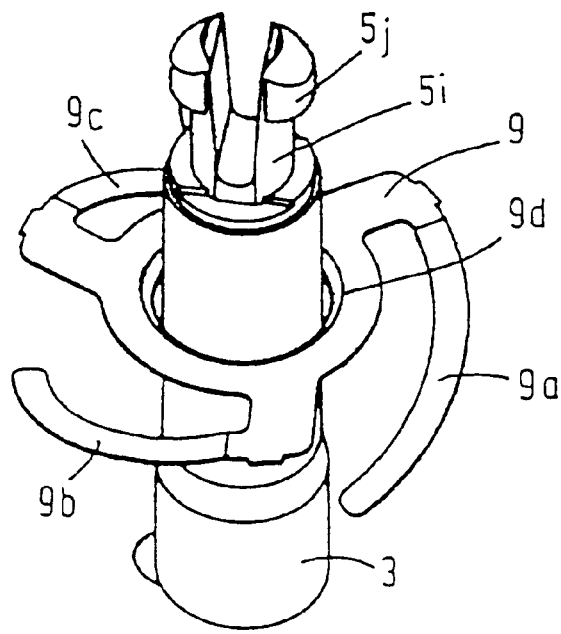

FIG. 2 is a perspective exploded view of the winding mandrel 5, the bearing spindle 3 and the spring 9. The spring 9 is an integral spring having three spring arms 9a, 9b and 9c which act upon the winding mandrel 5, and is radially guided by means of a center hole 9d.

In addition to the coupling fin 10a, FIG. 2 also shows the coupling fin 10b. The position of the coupling fin 10c is indicated. The winding mandrel 5 further has teeth 14. By means of these teeth, the winding mandrel 5 can be driven rotationally by a toothed drive wheel, which is now shown.

We claim:

1. A magnetic-tape-cassette apparatus having a tape deck comprising winding mandrels which are rotatable supported on bearing spindles, the winding mandrels being adapted to engage winding-mandrel holes in a magnetic-tape cassette, and each comprising at least one coupling fin arranged on a circumference, wherein the winding mandrels are mounted on the bearing spindles so as to be axially movable in a range of axial movement and are each pre-loaded towards a preferred axial position by at least one spring, characterized in that the integral springs are of an integral construction and comprise at least three spring arms.

2. A magnetic-tape-cassette apparatus having a tape deck comprising winding mandrels which are rotatably supported on bearing spindles, the winding mandrels being adapted to engage winding-mandrel holes in a magnetic-tape cassette, and each comprising at least one coupling fin arranged on a circumference, wherein the winding mandrels are mounted on the bearing spindles so as to be axially movable in a range of axial movement and are each pre-loaded towards a preferred axial position by at least one spring, characterized in that the winding mandrels are drivable by a drive wheel over the entire range of axial movement.

3. A magnetic-tape-cassette apparatus having a tape deck comprising winding mandrels which are rotatably supported on bearing spindles, the winding mandrels being adapted to engage winding-mandrel holes in a magnetic-tape cassette, and each comprising at least one coupling fin arranged on a circumference, wherein the winding mandrels are mounted on the bearing spindles so as to be axially movable in a range of axial movement and are each pre-loaded towards a preferred axial position by at least one spring, characterized in that the winding mandrels each have teeth for meshing with teeth of a drive wheel, an axial height and an axial position of the teeth being selected such that the teeth of the respective winding mandrel and the teeth of the drive wheel are in mesh with each other in the entire range of axial movement of the respective winding mandrel.

* * * * *

UNITED STATES PATENT AND TRADEMARK OFFICE
CERTIFICATE OF CORRECTION

PATENT NO. : 5,901,915
DATED : May 11, 1999
INVENTOR(S) : Norbert Kunze, et al.

It is certified that error appears in the above-identified patent and that said Letters Patent is hereby corrected as shown below:

On the Title page, item [56] the following references should be added:

U. S. PATENT DOCUMENTS

| EXAMINER INITIAL | PATENT NUMBER | | | | | | ISSUE DATE | PATENTEE | CLASS | SUBCLASS | FILING DATE IF APPROPRIATE |
|---|---|---|---|---|---|---|---|---|---|---|---|
| | 4 | 6 | 5 | 4 | 7 | 4 | 0 | 03/31/87 | Katoku | | | 10/16/85 |
| | | | | | | | | | | | | |

FOREIGN PATENT OR PUBLISHED FOREIGN PATENT APPLICATION

| | DOCUMENT NUMBER | | | | | | | PUBLICATION DATE | COUNTRY OR PATENT OFFICE | CLASS | SUBCLASS | TRANSLATION | |
|---|---|---|---|---|---|---|---|---|---|---|---|---|---|
| | | | | | | | | | | | | YES | NO |
| | 0 | 3 | 9 | 2 | 4 | 9 | 1 | A 2 | 04/11/90 | EUROPE | | | X | |

Signed and Sealed this

Eighteenth Day of April, 2000

Attest:

Q. TODD DICKINSON

*Attesting Officer*     *Director of Patents and Trademarks*